US011558793B2

United States Patent
Awoniyi-Oteri et al.

(10) Patent No.: US 11,558,793 B2
(45) Date of Patent: Jan. 17, 2023

(54) TECHNIQUES FOR PERFORMING CONDITIONAL HANDOVER IN WIRELESS COMMUNICATIONS

(71) Applicant: QUALCOMM Incorporated, San Diego, CA (US)

(72) Inventors: Olufunmilola Omolade Awoniyi-Oteri, San Diego, CA (US); Tao Luo, San Diego, CA (US); Yan Zhou, San Diego, CA (US); Wooseok Nam, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/015,961

(22) Filed: Sep. 9, 2020

(65) Prior Publication Data

US 2021/0076276 A1  Mar. 11, 2021

Related U.S. Application Data

(60) Provisional application No. 62/898,465, filed on Sep. 10, 2019.

(51) Int. Cl.
*H04W 36/00* (2009.01)

(52) U.S. Cl.
CPC . *H04W 36/00835* (2018.08); *H04W 36/0072* (2013.01)

(58) Field of Classification Search
CPC ....... H04W 36/0083; H04W 36/00837; H04W 36/08; H04W 36/18
See application file for complete search history.

(56) References Cited

U.S. PATENT DOCUMENTS

| 8,126,462 | B2 * | 2/2012 | Thakare | H04W 36/0055 |
| | | | | 455/436 |
| 10,798,628 | B2 * | 10/2020 | Tang | H04W 36/08 |
| 2005/0197124 | A1 * | 9/2005 | Kang | H04W 36/30 |
| | | | | 455/439 |

(Continued)

OTHER PUBLICATIONS

ETRI: "Conditional Make-Before-Break Handover," 3GPP Draft, 3GPP TSG-RAN WG2 Meeting #104, R2-1818046-Conditional MBB Handover, 3rd Generation Partnership Project (3GPP), Mobile Competence Centre, 650, Route Des Lucioles, F-06921, Sophia-Antipolis Cedex, France, vol. RAN WG2 No. Spokane, USA, Nov. 12, 2018-Nov. 16, 2018, Nov. 12, 2018 (Nov. 12, 2018), XP051557553, 4 pages, Retrieved from the Internet: URL: http://www.3gpp.org/ftp/Meetings%5F3GPP%5FSYNC/RAN2/Docs/R2%2D1818046%2Ezip [retrieved on Nov. 12, 2018].

(Continued)

*Primary Examiner* — Shantell L Heiber
(74) *Attorney, Agent, or Firm* — Arent Fox, LLP

(57) ABSTRACT

Aspects described herein relate to receiving, from a serving cell, a configuration for performing conditional handover to one or more target cells, establishing, based on detecting a condition from the configuration, a connection with a target cell for performing handover to the target cell, and transmitting, based on establishing the connection with the target cell and based on determining that the conditional handover is of a type where a source connection with the source cell remains, a notification to the serving cell.

30 Claims, 7 Drawing Sheets

(56) References Cited

U.S. PATENT DOCUMENTS

| | | | |
|---|---|---|---|
| 2006/0035639 A1* | 2/2006 | Etemad | H04W 36/18 |
| | | | 455/436 |
| 2006/0281461 A1* | 12/2006 | Kwun | H04W 28/18 |
| | | | 455/436 |
| 2014/0219244 A1* | 8/2014 | Prakash | H04L 1/00 |
| | | | 370/331 |
| 2015/0264665 A1* | 9/2015 | Vos | H04L 5/00 |
| | | | 370/329 |
| 2016/0198340 A1* | 7/2016 | Joung | H04W 36/00835 |
| | | | 370/329 |
| 2018/0132210 A1* | 5/2018 | Rico Alvarino | H04L 5/0053 |
| 2018/0323850 A1* | 11/2018 | Baligh | H04W 48/12 |
| 2018/0343043 A1* | 11/2018 | Hakola | H04B 7/0417 |
| 2019/0174373 A1* | 6/2019 | Kanazawa | H04W 36/0085 |
| 2019/0223073 A1 | 7/2019 | Chen et al. | |
| 2019/0253945 A1* | 8/2019 | Paladugu | H04W 76/27 |
| 2019/0281511 A1* | 9/2019 | Susitaival | H04W 36/36 |
| 2020/0029292 A1* | 1/2020 | Zou | H04L 1/0003 |
| 2020/0092769 A1* | 3/2020 | Yang | H04W 36/0072 |
| 2020/0336957 A1* | 10/2020 | Wu | H04W 36/00837 |
| 2021/0153245 A1* | 5/2021 | Tooher | H04W 72/046 |

OTHER PUBLICATIONS

International Search Report and Written Opinion—PCT/US2020/050240—ISA/EPO—Nov. 27, 2020.

Qualcomm Incorporated: "LTE Mobility Robustness Enhancements for DAPS eMBB HO," 3GPP Draft, 3GPP TSG-RAN WG2 Meeting #107, R2-1909844, Lte_Mobility_Robustess_Enhancement for DAPS EMBB H0 V1.DOCX, 3rd Generation Partnership Project (3GPP), Mobile Competence Centre, 650, Route Des Lucioles, F-06921, Sophia-Antipolis Cedex, France, vol. Ran WG2, No. Prague, Czech Republic, Aug. 26, 2019-Aug. 30, 2019, Aug. 16, 2019 (Aug. 16, 2019), XP051767636, 3 pages, Retrieved from the Internet: URL: http://www.3gpp.org/ftp/tsg_ran/.

* cited by examiner

TECHNIQUES FOR PERFORMING CONDITIONAL HANDOVER IN WIRELESS COMMUNICATIONS

CLAIM OF PRIORITY UNDER 35 U.S.C. § 119

The present application for patent claims priority to U.S. Provisional Patent Application No. 62/898,465, entitled "TECHNIQUES FOR PERFORMING CONDITIONAL HANDOVER IN WIRELESS COMMUNICATIONS" filed Sep. 10, 2019, which is assigned to the assignee hereof and hereby expressly incorporated by reference herein for all purposes.

BACKGROUND

Aspects of the present disclosure relate generally to wireless communication systems, and more particularly, to configuring and/or performing conditional handover among cells.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable low-latency communications (URLLC) with certain specifications for latency and reliability; and massive machine type communications, which can allow a very large number of connected devices and transmission of a relatively low volume of non-delay-sensitive information.

In some wireless communication technologies, a source cell can configure a user equipment (UE) to perform conditional handover to one or more target cells. The source cell can transmit the configuration to the UE before the handover event, where the configuration can specify parameters for performing the handover and one or more conditions for the UE to detect for performing the handover. The UE can accordingly attempt to detect the one or more conditions, and can initiate handover to the one or more corresponding target cells, without further instruction from the source cell, when the one or more conditions are detected.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes receiving, from a serving cell, a configuration for performing conditional handover to one or more target cells, establishing, based on detecting a condition from the configuration, a connection with a target cell for performing handover to the target cell, and transmitting, based on establishing the connection with the target cell, a notification to the serving cell.

In another example, a method of wireless communication is provided that includes transmitting, to a user equipment (UE), a configuration for performing conditional handover to one or more target cells, and receiving, from the UE, a notification related to the UE establishing a connection with the target cell.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods and examples described above and further herein. In another aspect, an apparatus for wireless communication is provided that includes means for performing the operations of methods and examples described above and further herein. In yet another aspect, a computer-readable medium is provided including code executable by one or more processors to perform the operations of methods and examples described above and further herein.

For example, an apparatus for wireless communication is provided that includes a transceiver, a memory configured to store instructions, and one or more processors communicatively coupled with the transceiver and the memory. The one or more processors are configured to receive, from a source cell, one or more configurations for performing conditional handover to one or more target cells, wherein the one or more configurations indicate to use a handover, establish, based on detecting a condition from the one or more configurations, a connection with a target cell for performing handover to the target cell, and transmit, based on establishing the connection with the target cell and based on the one or more configurations indicating to use the handover, a notification to the source cell.

In another example, an apparatus for wireless communication is provided that includes a transceiver, a memory configured to store instructions, and one or more processors communicatively coupled with the transceiver and the memory. The one or more processors are configured to transmit, to a UE, one or more configurations for performing conditional handover to one or more target cells, wherein the one or more configurations indicate to use a handover, and receive, from the UE, a notification related to the UE establishing a connection with the one or more target cells.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
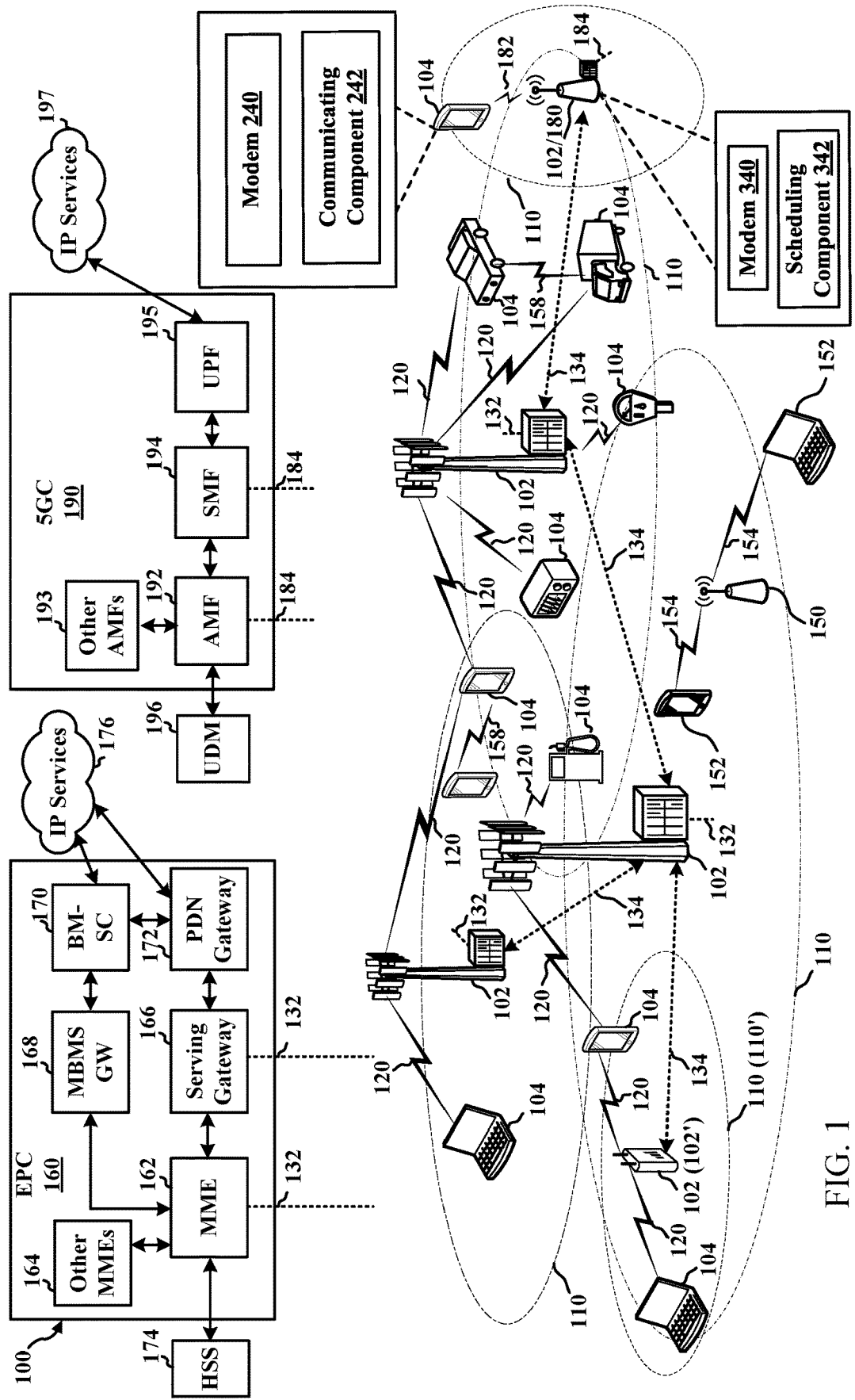
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to performing conditional handover in scenarios where a user equipment (UE) handing over from a source cell to one or more target cell may be in communication with both the source cell and the one or more target cells for a period of time. For example, in conditional handover, the source cell can configure the UE to perform handover to one or more target cells when one or more conditions are detected. In this regard, the decision to perform handover, once the configuration is received, can be on the UE, and thus the UE may be in communications with both the source cell and the target cell for at least a period of time before handover is completed. This may also be so in cases where conditional handover is used with other handover optimizations, such as make-before-break (MBB) handover, dynamic contention resolution scheme (DCRS) handover, etc. In MBB handover, for example, the source cell does not release the UE resources until the target cell indicates to the source cell that a connection is established with the UE. When the UE is concurrently connected to the source and target cells, in this regard, overlapping transmissions from the cells may occur. The MBB handover described herein may also be known as a Dual Active Protocol Stack (DAPS) handover.

In examples described herein, where a UE determines that it is connected with the source cell and one or more target cells (e.g., simultaneously), the UE can transmit a notification to the source cell, where the notification can relate to the simultaneous connection, at the UE, with the source cell and the one or more target cells. The notification can include one or more of an indication of a search space configuration or resource scheduling with the one or more target cells, an indication of one or more beams used by the one or more target cells, a request for activation of slot aggregation at the source cell, a request for the source cell to release resources, and/or the like. For example, the source cell may use the notification(s) for performing one or more functions related to the handover, such as scheduling resources for the UE to not collide with the search space configuration or resource scheduling of the target cell, using one or more beams similar to those used by the target cell, activating slot aggregation to improve reliability of source cell communications during handover, releasing the resources as requested by the UE, etc. This can help avoid occurrence of overlapping transmissions from the source cell and target cell.

The described features will be presented in more detail below with reference to FIGS. 1-7.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for configuring conditional handover and/or notifying a source cell of occurrence of a conditional handover. In addition, some nodes may have a modem 340 and scheduling component 342 for configuring a UE to perform conditional handover and/or receiving a notification of conditional handover therefrom, as described herein. Though a UE 104 is shown as having the modem 240 and communicating component 242 and a base station 102 is shown as having the modem 340 and scheduling component 342, this is one illustrative example, and substantially any node or type of node may include a modem 240 and communicating component 242 and/or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 can configure conditional handover to one or more target cells (provided by one or more base station 102) based on detecting one or more conditions. Where communicating component 242 detects the one or more conditions, it can initiate handover to the one or more target cells, and in some examples, can transmit a notification of the conditional handover to a source cell (provided by one or more base stations 102, which may be a different or same base station that provides one or more target cells). The notification may include parameters related to the UE 104 communicating with the target cell and/or can otherwise include requests related to the UE 104 communicating with the source cell. In any case, the source cell (or corresponding base station 102) can modify parameters for communicating with the UE 104 based at least in part on receiving the notification. This can avoid overlapping transmissions between the source cell and one or more target cell, as described above and further herein.

Figure 2:
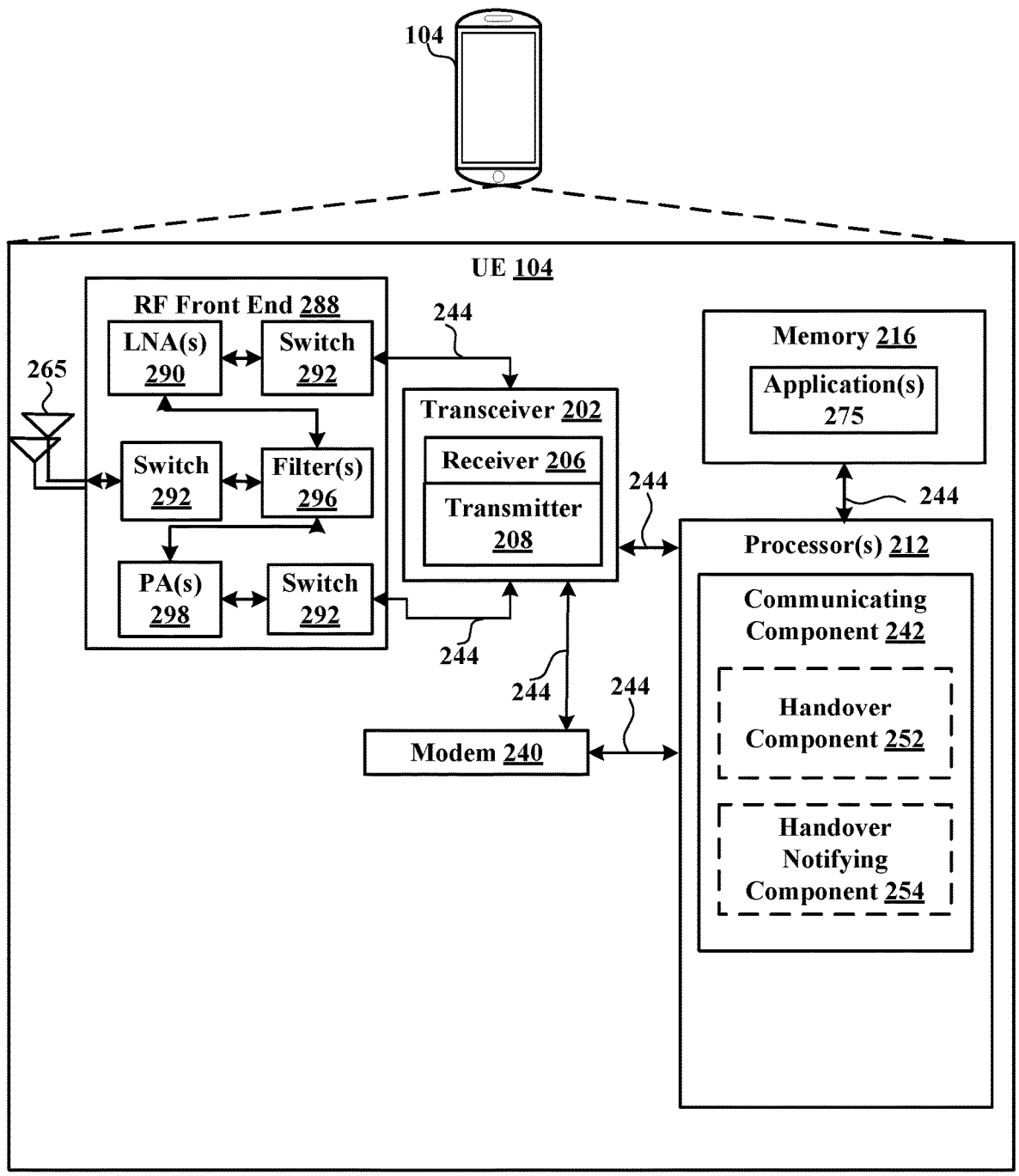
FIG. 2 is a block diagram illustrating an example of a UE, in accordance with various aspects of the present disclosure.
Figure 3:
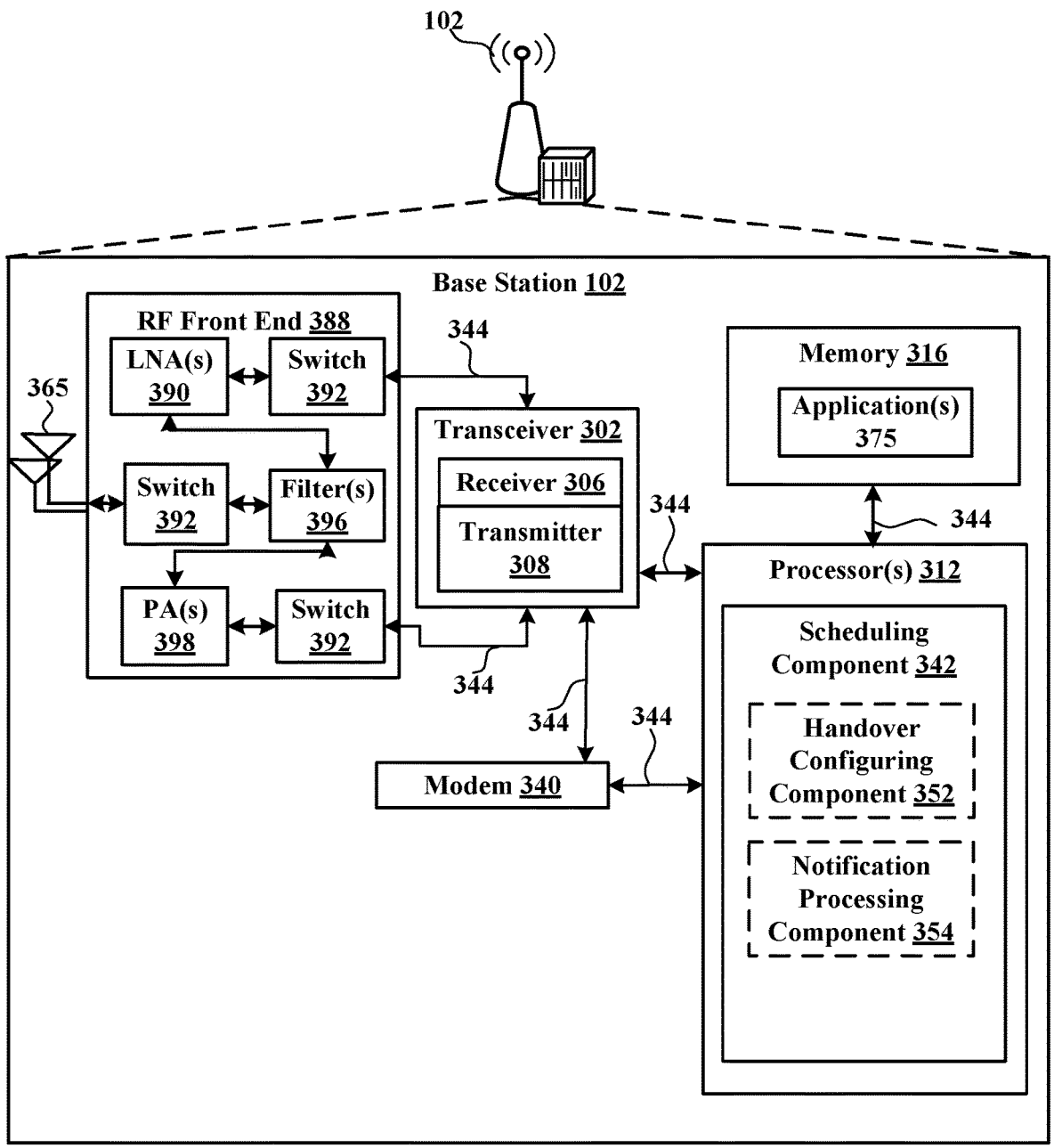
FIG. 3 is a block diagram illustrating an example of a base station, in accordance with various aspects of the present disclosure.
Figure 4:
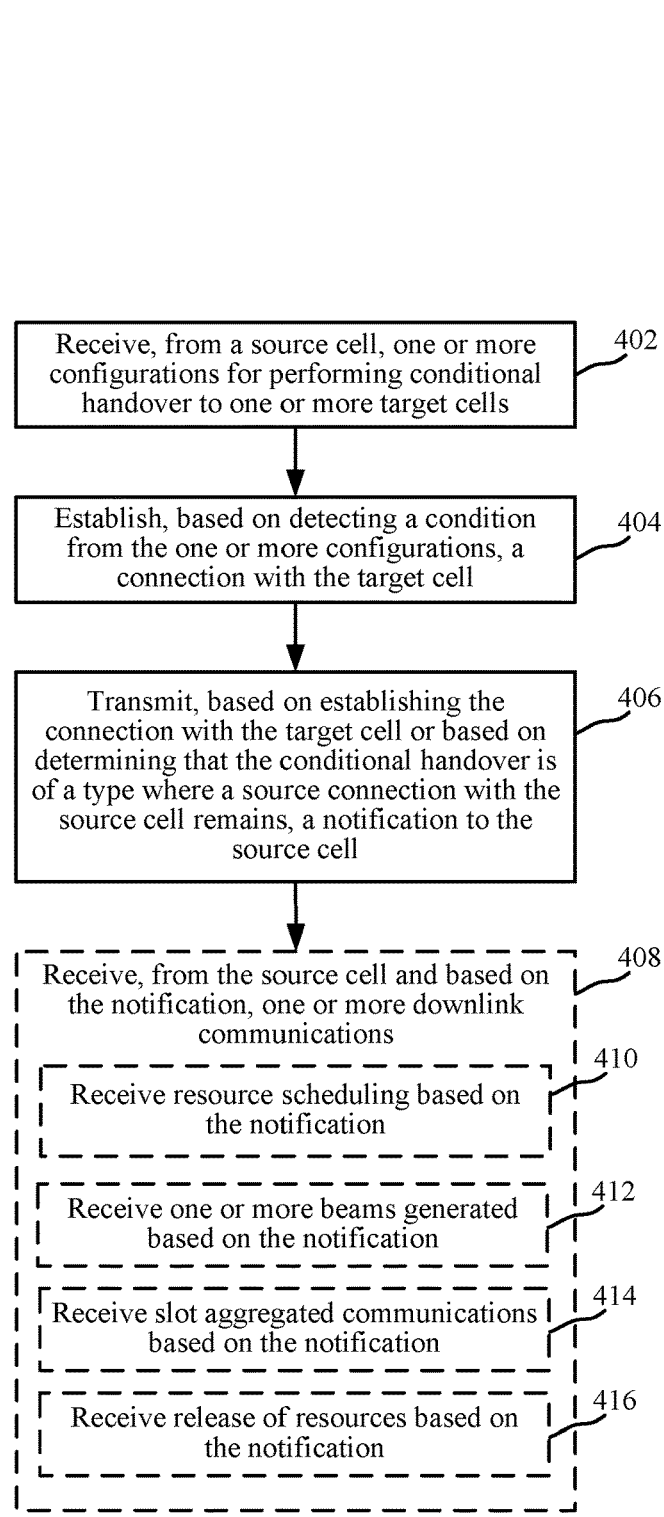
FIG. 4 is a flow chart illustrating an example of a method for transmitting a notification related to conditional handover, in accordance with various aspects of the present disclosure.
Figure 5:
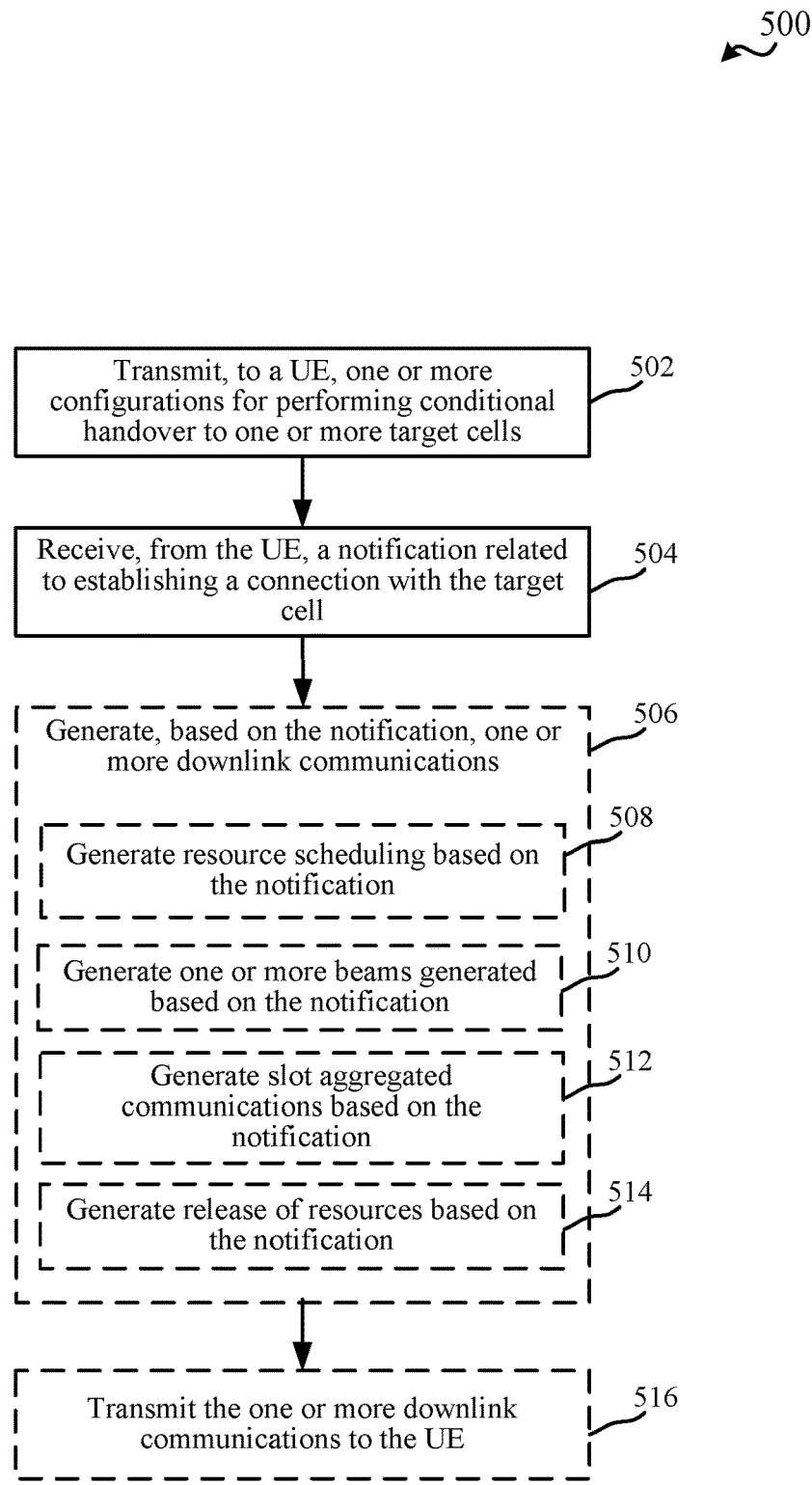
FIG. 5 is a flow chart illustrating an example of a method for receiving a notification related to conditional handover, in accordance with various aspects of the present disclosure.
Figure 6:
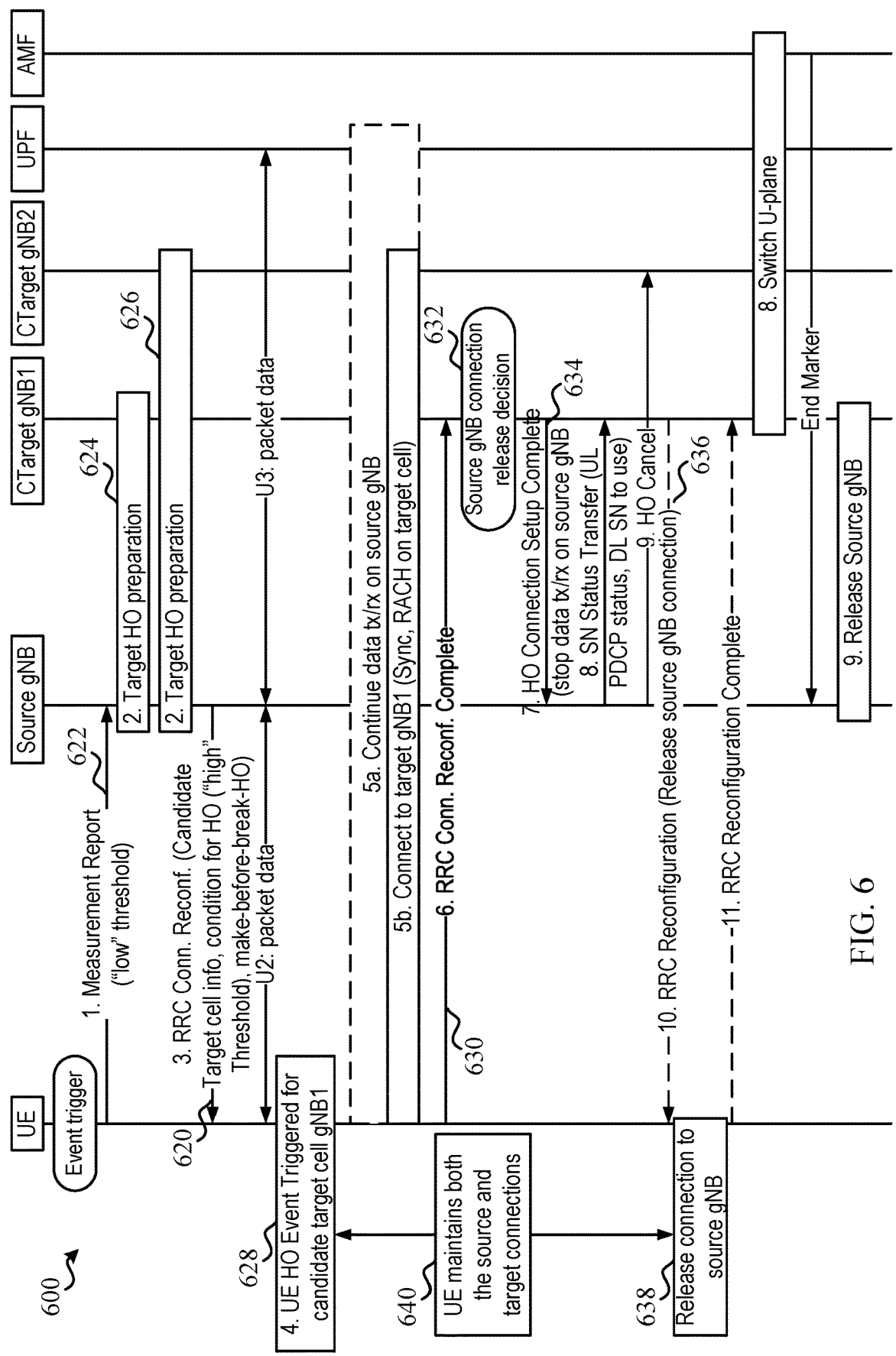
FIG. 6 illustrates an example of a system for performing conditional handover, in accordance with various aspects of the present disclosure.

Turning now to FIGS. 2-7, aspects are depicted with reference to one or more components and one or more methods that may perform the actions or operations described herein, where aspects in dashed line may be optional. Although the operations described below in FIGS. 4-6 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for performing conditional handover and/or notifying a source cell of the conditional handover, as described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a handover component 252 for performing conditional handover from a source cell to one or more target cells, which may be based on a conditional handover configuration received from the source cell, and/or a handover notifying component 254 for transmitting a notification (e.g., to the source cell) related to performing the conditional handover to the one or more target cells, as described herein.

In an aspect, the processor(s) 212 may correspond to one or more of the processors described in connection with the UE in FIG. 7. Similarly, the memory 216 may correspond to the memory described in connection with the UE in FIG. 7.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and scheduling component 342 for configuring conditional handover to one or more UEs and/or receiving a notification of occurrence of the conditional handover from the one or more UEs, as described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, scheduling component 342 can optionally include a handover configuring component 352 for configuring conditional handover for one or more UEs and/or a notification processing component 354 for obtaining and processing a notification of occurrence of the conditional handover from the one or more UEs and/or accordingly generating downlink communications for transmitting to the one or more UEs.

In an aspect, the processor(s) 312 may correspond to one or more of the processors described in connection with the base station in FIG. 7. Similarly, the memory 316 may correspond to the memory described in connection with the base station in FIG. 7.

FIG. 4 illustrates a flow chart of an example of a method 400 for notifying of a conditional handover to one or more target cells. FIG. 5 illustrates a flow chart of an example of a method 500 for receiving notification of conditional handover to one or more target cells. Methods 400 and 500 are described in conjunction with one another for ease of explanation, though the methods 400 and 500 are not required to be performed in conjunction. In an example, a UE 104 can perform the functions described in method 400 using one or more of the components described in FIGS. 1 and 2 and/or a base station 102 and/or other network component can perform the functions described in method 500 using one or more of the components described in FIGS. 1 and 3.

In method 500, at Block 502, one or more configurations for performing conditional handover to one or more target cells can be transmitted to a UE. In an aspect, handover configuring component 352, e.g., in conjunction with processor(s) 312, memory 316, transceiver 302, scheduling component 342, etc., can transmit, to the UE, the one or more configurations for performing conditional handover to the one or more target cells. For example, the UE 104 can be communicating with the base station 102 in a cell provided as a source cell from which the UE 104 can perform conditions handover to the one or more target cells. In an example, handover configuring component 352 can generate the configuration(s) to include an indication of the one or more target cells, which may include cells that are nearby the source cell. In an example, handover configuring component 352 can determine the one or more target cells based on a measurement report received from the UE 104 or other UEs (e.g., which may be generated to include target cells having a reported measurement that achieves a threshold and/or complies with other constraints). In addition, for example, handover configuring component 352 can generate the configuration(s) to include one or more conditions under which the UE 104 can perform conditional handover to the one or more target cells (e.g., signal power/quality of the target cell(s) achieving a threshold, signal power/quality of the source cell falling below a threshold, etc.). In addition, for example, handover configuring component 352 can generate the configuration(s) to include an indication of one or more handover optimizations to use in performing conditional handover (e.g., MBB handover, DCRS handover, etc.). In one example, the a given conditions of the one or more conditions can be indicated as relating to perform conditional handover to any of the one or more target cells, a subset of the one or more target cells, a given one of the one or more target cells, etc.

For example, the conditional handover can be implemented by the wireless communication technology to be performed when a source cell (e.g., provided by a base station 102) prepares resources of N number of potential target cells (e.g., provided by the base station 102 and/or other base stations) to which the UE can handover. In conditional handover, for example, the source call can also provide to the UE 104 conditions under which the UE should handover to one of the N cells. Once the handover condition is met, as described further herein, the UE 104 can determine which of the cells is best suited for conditional handover of the UE 104 (e.g., which of the cells has a highest signal strength/quality, offers services desired by the UE 104, is of a network operator associated with a subscription of the UE, or is otherwise deemed most desirable, etc.). In another example, once the handover condition is met, where the handover condition relates to a specific one of the one or more target cells, the UE 104 can determine to handover to the specific target cell. In any case, when the UE connects to one of the target cells, the target cell can inform the source cell of the handover so the source cell can release resources allocated to the UE 104.

In method 400, at Block 402, one or more configurations for performing conditional handover to one or more target cells can be received from a source cell. In an aspect, handover component 252, e.g., in conjunction with processor(s) 212, memory 216, transceiver 202, communicating component 242, etc., can receive, from the source cell, the one or more configurations for performing conditional handover to one or more target cells. For example, the one or more configurations can include one or more parameters for performing conditional handover from the source cell to the one or more target cells, such as parameters related to the one or more target cells (e.g., parameters for establishing the connection with the one or more target cells, such as one or more cell identifiers, an indication of one or more handover optimizations to use, etc.). The one or more configurations may also indicate one or more conditions based on which to perform conditional handover at the UE 104. For example, the one or more conditions can relate to measuring a signal power or quality of signals received from the one or more target cells, and determining whether the signal power or quality achieves one or more thresholds. In another example, the one or more conditions can relate to measuring a signal power or quality of the source cell, and determining whether the signal power or quality falls below one or more thresholds, etc. In addition, for example, the one or more configurations may include a configuration or indication to use a MBB handover, DCRS handover, etc.

FIG. 6 illustrates an example of a system 600 for performing conditional handover, where a UE can receive a configuration 620 for performing conditional handover based on a measurement report 622 provided to a source cell (e.g., source gNB). The measurement report 622 can include measurements of signals received from one or more target cells, as described. In this example, source gNB can determine one or more target cells to prepare for receiving handover of the UE via handover preparation messages 624, 626, and can provide information regarding the one or more target cells and condition(s) for performing handover thereto in the configuration 620 sent back to the UE. The UE can monitor for occurrence of the one or more conditions for performing the conditional handover at 628. Once detected, the UE can initiate conditional handover to the target cell (which can be a target cell to which the UE determines to handover), which may be based on one or more other considerations. The UE can initiate the conditional handover by sending a connection reconfiguration complete message 630 to the target cell based on detecting the condition (and/or based on determining the target cell as the most desirable target cell). The target cell can indicate, to the source cell, that handover is complete based on decision 632 and transmitting one or more messages 634 thereto, as shown.

As described, however, when certain handover optimizations are enabled, such as MBB handover, DCRS handover, etc., the source cell may remain connected to the UE for some time after the UE performs the conditional handover (e.g., based on waiting for the messages 634 from the target cell). Once the source cell transmits a release message 636 to the UE, the UE can release its connection to the source cell at 638. During this time 640, the UE may remain connected to both the target cell and the source cell. In these examples, the UE 104 may desire to prevent overlapping transmissions from the source and target cells at least in part by transmitting a notification to the source cell, where the notification is related to occurrence of the conditional handover, as described further herein (e.g., in reference to Block 406 of method 400 in FIG. 4).

In method 400, at Block 404, a connection can be established with the target cell based on detecting a condition from the one or more configurations. In an aspect, handover component 252, e.g., in conjunction with processor(s) 212, memory 216, transceiver 202, communicating component 242, etc., can establish, based on detecting the condition from the one or more configurations, the connection with the target cell. For example, the condition may correspond to a general condition regardless of the target cell (e.g., a condition of the source cell) or may be a condition specific to each target cell in the configuration, etc. As described, for example, the condition can relate to signal power/quality (or detecting the signal power/quality achieves or does not achieve one or more thresholds) at the target cell(s) and/or source cell, etc., and the handover component 252 can measure signal powers/qualities to determine when to initiate the conditional handover to the one or more target cells.

In method 400, at Block 406, a notification can be transmitted to the source cell based on establishing the connection with the target cell or based on determining that the conditional handover is of a type where a connection with the source cell remains. In an aspect, handover notifying component 254, e.g., in conjunction with processor(s) 212, memory 216, transceiver 202, communicating component 242, etc., can transmit, based on establishing the connection with the target cell or based on determining that the conditional handover is of a type where a connection with the source cell remains (e.g., at least for a period of time after establishing the connection with the target cell), the notification to the source cell. For example, handover notifying component 254 can transmit the notification based at least in part on determining that the UE 104 is simultaneously connected to the source cell and target cell for at least a period of time during the handover. In one example, handover notifying component 254 can transmit the notification based on detecting existence of scheduled resources for the UE 104 from both the source cell and target cell (e.g., over a similar period of time or otherwise). In another example, handover notifying component 254 can transmit the notification based on determining that conditional handover is of a type where a connection where the source cell remains (e.g., based on the one or more configurations indicating to use MBB handover, DCRS handover, or other optimizations, etc.) for at least a period of time as part of the handover. In any case, transmitting the notification can avoid overlap in transmissions from the source cell and target cell.

In one example, the notification can include a notification of search space configuration(s) or schedule from the target cell over which the target cell can transmit downlink communications to the UE 104 (over a physical downlink control channel (PDCCH)). For example, such notifications may include resources configured for a common search space (CSS), UE-specific search space (DESS), etc. In another example, the notification can include a notification of resources scheduled by the target cell for transmitting downlink communications to the UE 104 (e.g., PDCCH or physical downlink shared channel (PDSCH) resources). In either example, the source cell can receive the notification and can avoid overlapping the indicated schedule in scheduling downlink resources for the source cell to the UE 104, as described further herein. In another example, the notification can indicate parameters related to one or more beams used by the target cell (e.g., beamforming parameters to create the beam or a similar beam), in which case the source cell can transmit downlink communications using the same or a similar beam determined based on the indicated parameters. In yet another example, the notification can include a request for activation of slot aggregation, in which case the source cell can activate slot aggregation in transmitting downlink communications to the UE 104 for higher reliability during the MBB handover. In yet another example, the notification can include a request to release resources from the source cell, in which case the source cell can release the resources for the UE 104. In an example, the request to release resources may include a time indicated in the request where the time indicates the time during which the resources scheduled from the source cell are to be released (e.g., an OFDM symbol, slot, etc., during or after which the resources are to be released).

In addition, for example, handover notifying component 254 can transmit the notification to the source cell in grant-free resources that may be indicated in the configuration for conditional handover, over control channel or shared channel resources ongoing on the connection between the source cell and UE 104, etc. For example, the conditional handover configuration received from the source cell (e.g., as described with reference to Block 402) may include an indication of grant-free resources for communicating with the source cell. In this regard, for example, handover notifying component 254 can transmit the notification to the source cell over the grant-free resources as indicated in the conditional handover configuration. In another example, handover notifying component 254 can transmit the notification by including the notification in data otherwise communicated over a control channel (e.g., physical uplink control channel (PUCCH)) or data channel (e.g., physical uplink shared channel (PUSCH)) established with the source cell.

In method 500, at Block 504, a notification related to establishing a connection with the target cell can be received from the UE. In an aspect, notification processing component 354, e.g., in conjunction with processor(s) 312, memory 316, transceiver 302, scheduling component 342, etc., can receive, from the UE, the notification related to establishing the connection with the target cell. For example, the notification can include information relating to avoiding overlap in transmissions between the source cell and one or more target cells, as described, such as an indication of search space configuration or resources from the target cell, one or more beams used by the target cell, a request to activate slot aggregation, a request to release resources for the UE 104, etc.

In method 500, optionally at Block 506, one or more downlink communications can be generated based on the notification. In an aspect, scheduling component 342, e.g., in conjunction with processor(s) 312, memory 316, transceiver 302, etc., can generate, based on the notification, the one or more downlink communications (e.g., for the UE 104). For example, notification processing component 354 can generate the one or more downlink communications to avoid overlap in transmissions from the one or more target cells based on information included in the notification.

In one example, in generating the one or more downlink communications at Block 506, optionally at Block 508, resource scheduling can be generated based on the notification. For example, scheduling component 342 can generate the resource scheduling to schedule downlink resources (e.g., PDCCH, PDSCH, etc., resources) for the UE 104. In scheduling the downlink resources, for example, scheduling component 342 can schedule the downlink resources such to avoid resources that overlap the search space configuration or resources (e.g., for CSS, UESS, PDCCH, PDSCH, etc. of the target cell) as indicated in the notification.

In another example, in generating the one or more downlink communications at Block 506, optionally at Block 510, one or more beams can be generated based on the notification. For example, scheduling component 342 can generate the one or more beams for transmitting downlink communications to the UE 104, where the one or more beams can be generated based on the one or more beams used by the one or more target cells, parameters of which can be in the notification. For example, the notification can include a beam identifier, a beam direction, or other beamforming parameters that are based on beams detected from the one or more target cells, and scheduling component 342 can use the parameters to beamform downlink signals for the UE 104. For example, scheduling component 342 can beamform the downlink signals to be of the same or similar beam (e.g., to have a same or similar directionality with respect to the UE 104) as that indicated in the notification. For example, scheduling component 342 can use the beam in downlink communications with the UE 104 based on receiving the notification and until the UE 104 disconnects from the source cell.

In another example, in generating the one or more downlink communications at Block 506, optionally at Block 512, slot aggregated communications can be generated based on the notification. For example, scheduling component 342 can generate the slot aggregated communications based on a request for such indicated in the notification. For example, the notification can request slot aggregated communications from the source cell to improve reliability thereof, and scheduling component 342 can accordingly generate downlink communications to span multiple aggregated slots in transmitting the communications to the UE 104. For example, scheduling component 342 can generate the slot aggregated communications based on receiving the notification and until the UE 104 disconnects from the source cell.

In another example, in generating the one or more downlink communications at Block 506, optionally at Block 514, release of resources can be generated based on the notification. For example, scheduling component 342 can generate the release of resources based on a request for such indicated in the notification. For example, scheduling component 342 can generate the release as an indication to release downlink and/or uplink resources previously configured by the base station 102 for communicating with the UE 104. For example, scheduling component 342 can transmit an indication of the release of resources to the UE 104. In any case, releasing the resources can avoid overlap with target cell communications that may occur over the previously configured resources.

In method 500, at Block 516, the one or more downlink communications can be transmitted to the UE. In an aspect, scheduling component 342, e.g., in conjunction with processor(s) 312, memory 316, transceiver 302, etc., can transmit the one or more downlink communications to the UE, which may include transmitting the one or more downlink communications as generated at Block 506 (e.g., and/or over the resources that avoid overlap with resources used by the one or more target cells).

In method 400, optionally at Block 408, one or more downlink communications can be received from the source cell and based on the notification. In an aspect, communicating component 242, e.g., in conjunction with processor(s) 212, memory 216, transceiver 202, etc., can receive, from the source cell (or corresponding base station 102) and based on the notification, the one or more downlink communications. As described, for example, the one or more downlink communications can have been generated to avoid overlap with communications of the one or more target cells.

In an example, receiving the one or more downlink communications at Block 408 can optionally include, at Block 410, receiving resource scheduling based on the notification. As described, the resource scheduling can be based on search space configuration and/or resource information of the target cell as provided in the notification at Block 406, and thus can be generated to avoid overlap with search space resources. For example, the resource scheduling can include PDCCH and/or PDSCH scheduling over which the UE 104 can receive downlink communications from the source cell while also communicating with the target cell.

In another example, receiving the one or more downlink communications at Block 408 can optionally include, at Block 412, receiving one or more beams generated based on the notification. As described, the one or more beams can correspond to one or more beams identified by the UE 104 and indicated in the notification (e.g., based on parameters indicated in the notification for generating the beam or otherwise). For example, the UE 104 can receive downlink signaling from the source cell that is beamformed using the one or more beams, such that the UE 104 can receive similar beams from the source cell and target cell while the UE 104 is connected to the source cell.

In another example, receiving the one or more downlink communications at Block 408 can optionally include, at Block 414, receiving slot aggregated communications based on the notification. As described, this can be based on a request indicated in the notification to receive slot aggregated communications from the source cell to improve reliability thereof. For example, the UE 104 can receive downlink signaling from the source cell that is slot aggregated to improve reliability while the UE 104 is also receiving downlink signaling from the target cell while the UE 104 is connected to the source cell.

In another example, receiving the one or more downlink communications at Block 408 can optionally include, at Block 416, receiving release of resources based on the notification. As described, this can including receiving an indication that resources with the source cell are being released. The UE 104 can accordingly release the resources, which can further avoid overlap from the source cell when receiving downlink communications from the target cell over the resources.

Figure 7:
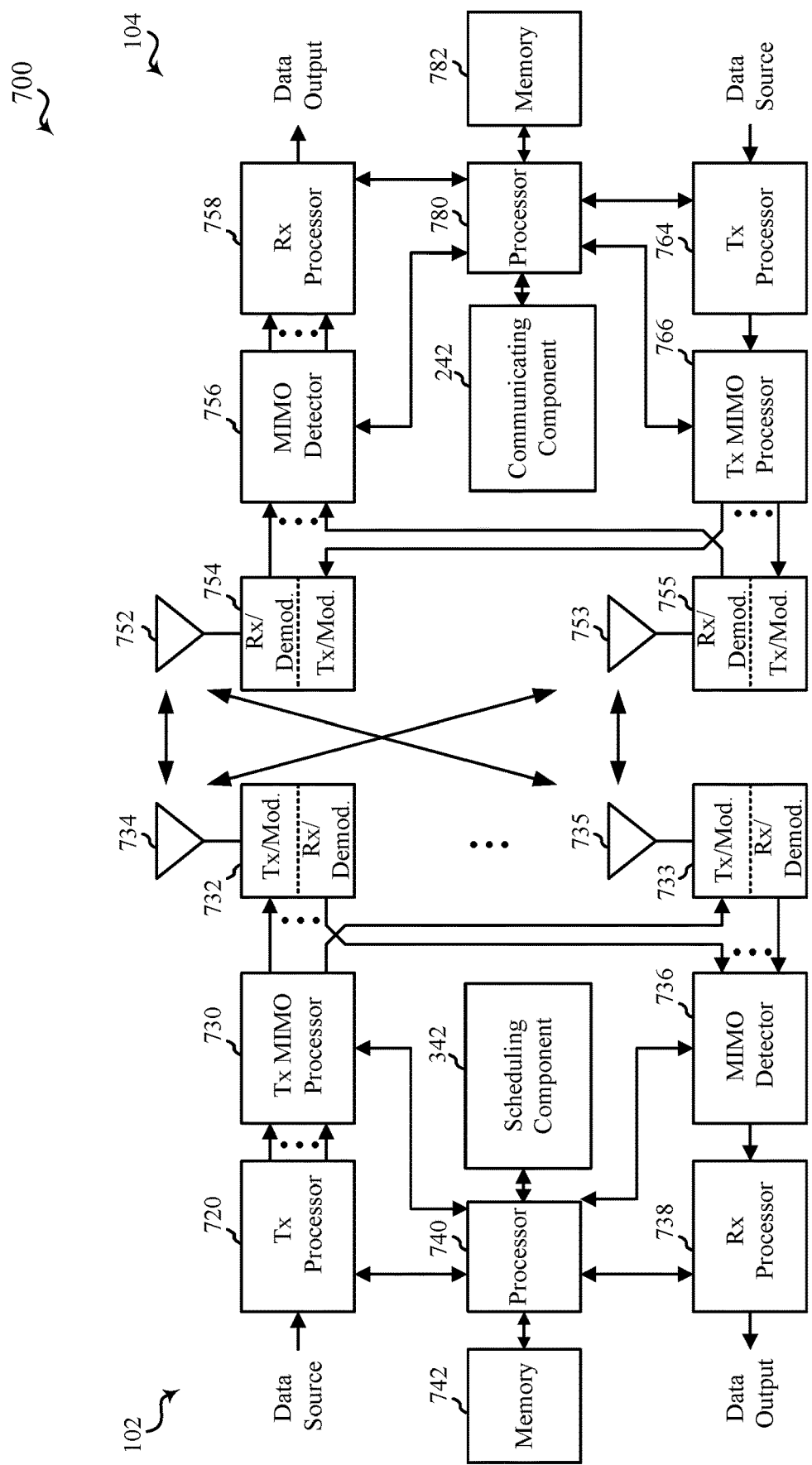
FIG. 7 is a block diagram illustrating an example of a MIMO communication system including a base station and a UE, in accordance with various aspects of the present disclosure.

FIG. 7 is a block diagram of a MIMO communication system 700 including a base station 102 and a UE 104, in accordance with various aspects of the present disclosure. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1-2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a scheduling component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, comprising:
receiving, by a user equipment (UE) and from a source cell with which the UE is communicating, one or more configurations for performing conditional handover to one or more target cells, wherein the one or more configurations indicate to use a make-before-break handover;
establishing, by the UE and based on detecting a condition from the one or more configurations, a connection with a target cell for performing handover of the UE to the target cell; and
transmitting, by the UE and based on establishing the connection with the target cell and based on the one or more configurations indicating to use the make-before-break handover, a notification to the source cell, wherein the notification indicates at least one of:
a search space configuration received, by the UE, from the target cell;
a resource scheduling parameter received, by the UE, from the target cell, wherein the resource scheduling parameter indicates downlink resources scheduled for the UE to receive downlink communications from the target cell;
one or more beams detected, by the UE, as used by the target cell in downlink communications received from the target cell after establishing the connection with the target cell; or
a request to activate, by the source cell, slot aggregation in transmitting downlink communications.

2. The method of claim 1, wherein the notification indicates at least one of the search space configuration or the resource scheduling parameter received from the target cell.

3. The method of claim 1, wherein the notification indicates the one or more beams detected as used by the target cell in downlink communications received from the target cell.

4. The method of claim 1, wherein the notification indicates to request to activate, by the source cell, slot aggregation in transmitting downlink communications.

5. The method of claim 1, wherein the notification further includes a request for the source cell to release resources.

6. The method of claim 5, wherein the notification indicates a time period for the source cell to release the resources.

7. The method of claim 1, wherein transmitting the notification to the source cell comprises transmitting the notification over grant-free resources indicated in the one or more configurations for performing conditional handover.

8. The method of claim 1, wherein transmitting the notification to the source cell comprises transmitting the notification along with other data over a control channel or a shared channel.

9. A method for wireless communication, comprising:
transmitting, by a source cell to a user equipment (UE) communicating with the source cell, one or more configurations for performing conditional handover to one or more target cells, wherein the one or more configurations indicate to use a make-before-break handover; and
receiving, by the source cell and from the UE, a notification related to the UE establishing a connection with the one or more target cells, wherein the notification indicates at least one of:
a search space configuration received, by the UE, from the one or more target cells;
a resource scheduling parameter received, by the UE, from the one or more target cells, wherein the resource scheduling parameter indicates downlink resources scheduled for the UE to receive downlink communications from the one or more target cells;
one or more beams detected, by the UE, as used by the one or more target cells in downlink communications received from the one or more target cells after the UE establishes the connection with the one or more target cells; or
a request to activate, by the source cell, slot aggregation in transmitting downlink communications.

10. The method of claim 9, wherein the notification indicates at least one of the search space configuration or the resource scheduling parameter, and further comprising scheduling resources for the UE based on at least one of the search space configuration or the resource scheduling parameter related to the one or more target cells.

11. The method of claim 9, wherein the notification indicates the one or more beams, and further comprising transmitting downlink communications to the UE based on the one or more beams or related beams.

12. The method of claim 9, wherein the notification indicates the request to activate slot aggregation, and further comprising activating slot aggregation in transmitting downlink communications to the UE.

13. The method of claim 9, wherein the notification further includes a request to release resources, and further comprising releasing resources related to the UE based at least in part on the request.

14. The method of claim 13, wherein the notification indicates a time period for releasing the resources.

15. The method of claim 9, further comprising indicating, in the one or more configurations for performing conditional handover, grant-free resources for the UE, wherein receiving the notification comprises receiving the notification over the grant-free resources.

16. The method of claim 9, wherein receiving the notification comprises receiving the notification along with other data over a control channel or a shared channel.

17. An apparatus for wireless communication, comprising:
a transceiver;
a memory configured to store instructions; and
one or more processors communicatively coupled with the transceiver and the memory, wherein the one or more processors are configured to:
receive, from a source cell communicating with the apparatus, one or more configurations for performing conditional handover to one or more target cells, wherein the one or more configurations indicate to use a make-before-break handover;
establish, based on detecting a condition from the one or more configurations, a connection with a target cell for performing handover of the apparatus to the target cell; and
transmit, based on establishing the connection with the target cell and based on the one or more configurations indicating to use the make-before-break handover, a notification to the source cell, wherein the notification indicates at least one of:
a search space configuration received from the target cell;
a resource scheduling parameter received from the target cell, wherein the resource scheduling parameter indicates downlink resources scheduled for the apparatus to receive downlink communications from the target cell;
one or more beams detected as used by the target cell in downlink communications received from the target cell after establishing the connection with the target cell; or
a request to activate, by the source cell, slot aggregation in transmitting downlink communications.

18. The apparatus of claim 17, wherein the notification indicates at least one of the search space configuration or the resource scheduling parameter received from the target cell.

19. The apparatus of claim 17, wherein the notification indicates the one or more beams detected as used by the target cell in downlink communications received from the target cell.

20. The apparatus of claim 17, wherein the notification indicates the request to activate, by the source cell, slot aggregation in transmitting downlink communications.

21. The apparatus of claim 17, wherein the notification further includes a request for the source cell to release resources.

22. The apparatus of claim 21, wherein the notification indicates a time period for the source cell to release the resources.

23. The apparatus of claim 17, wherein the one or more processors are configured to transmit the notification to the source cell over grant-free resources indicated in the one or more configurations for performing conditional handover.

24. The apparatus of claim 17, wherein the one or more processors are configured to transmit the notification to the source cell along with other data over a control channel or a shared channel.

25. An apparatus for wireless communication, comprising:
a transceiver;
a memory configured to store instructions; and one or more processors communicatively coupled with the transceiver and the memory, wherein the one or more processors are configured to:
 transmit, to a user equipment (UE) communicating with a source cell provided by the apparatus, one or more configurations for performing conditional handover to one or more target cells, wherein the one or more configurations indicate to use a make-before-break handover; and
 receive, from the UE, a notification related to the UE establishing a connection with the one or more target cells, wherein the notification indicates at least one of:
  a search space configuration received, by the UE, from the one or more target cells;
  a resource scheduling parameter received, by the UE, from the one or more target cells, wherein the resource scheduling parameter indicates downlink resources scheduled for the UE to receive downlink communications from the one or more target cells;
  one or more beams detected, by the UE, as used by the one or more target cells in downlink communications received from the one or more target cells after the UE establishes the connection with the one or more target cells; or
  a request to activate, by the source cell, slot aggregation in transmitting downlink communications.

26. The apparatus of claim 25, wherein the notification indicates at least one of the search space configuration or the resource scheduling parameter, and wherein the one or more processors are configured to schedule resources for the UE based on at least one of the search space configuration or the resource scheduling parameter related to the one or more target cells.

27. The apparatus of claim 25, wherein the notification indicates the one or more beams detected as used by the one or more target cells, and wherein the one or more processors are configured to transmit downlink communications to the UE based on the one or more beams or related beams.

28. The apparatus of claim 25, wherein the notification indicates the request to activate slot aggregation, and wherein the one or more processors are configured to activate slot aggregation in transmitting downlink communications to the UE.

29. The apparatus of claim 25, wherein the notification further includes a request to release resources, and wherein the one or more processors are configured to release resources related to the UE based at least in part on the request.

30. The apparatus of claim 25, wherein the one or more processors are configured to indicate, in the one or more configurations for performing conditional handover, grant-free resources for the UE, wherein the one or more processors are configured to receive the notification over the grant-free resources.

* * * * *